June 23, 1964   H. D. HULTERSTRUM   3,138,309
LEADER DISPENSER CUTTER
Filed May 8, 1961
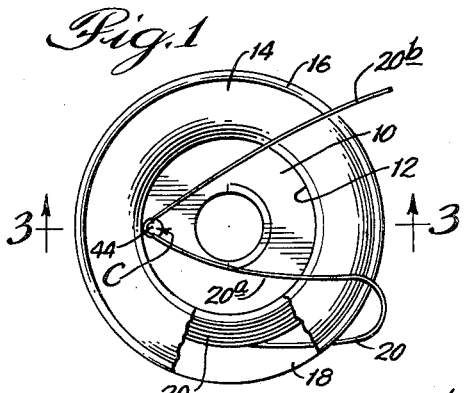
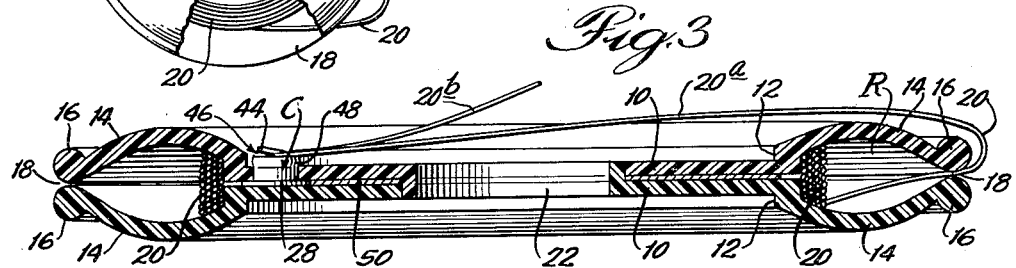
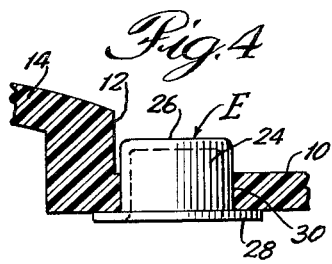
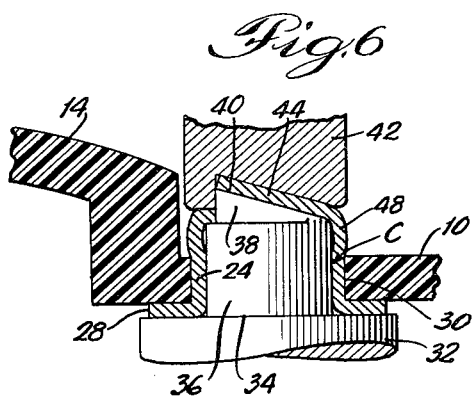
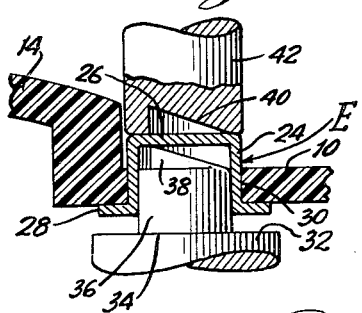
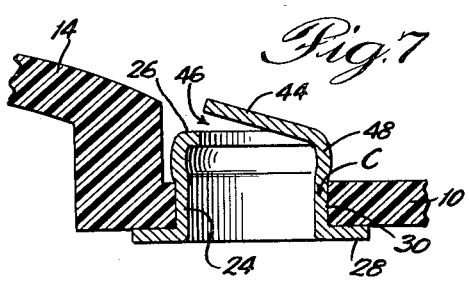
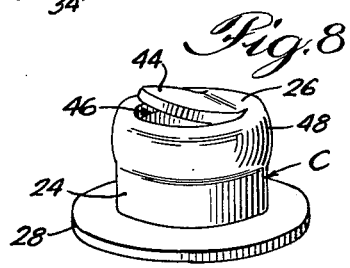
INVENTOR:
Harold D. Hulterstrum,
BY
Bair, Freeman & Molinare
ATTORNEYS.

United States Patent Office 3,138,309
Patented June 23, 1964

3,138,309
LEADER DISPENSER CUTTER
Harold D. Hulterstrum, Baraboo, Wis., assignor to Flambeau Plastics Corporation, Baraboo, Wis., a corporation of Wisconsin
Filed May 8, 1961, Ser. No. 108,556
2 Claims. (Cl. 225—59)

This invention relates to a novel cutter of inexpensive construction for a dispensing reel of fishing leader.

Reels of cord, fishing leader and the like have for many years been provided with thread cutters of one form or another which, while they have been relatively inexpensive, have not attained the ultimate in economy. It is therefore one object of my present invention to provide a cutter which is formed of an inexpensive stock part, being in the initial form of an "eyelet" of the type comprising a short tube closed at one end and provided with an outwardly projecting flange at its other end. These eyelets are normally made for securing several papers together, being projected through punched openings in the papers, and the closed end deformed in an eyeletting machine to provide a second flange to retain the eyelet with respect to the papers. Since they are a stock item and sold in great quantities by stationers and the like they are relatively inexpensive.

Another object of my invention therefore is to provide a reel for fishing leader which is readily adapted by means of a perforation in the reel to receive the eyelet whereupon the eyelet is deformed to retain it in position and simultaneously the closed end of the eyelet is partially sheared through in order to provide a cutter attached to the reel which may be used to cut individual leaders from the length of leader wound on the reel.

A further object is to provide a cutter which does not have to be oriented relative to the reel, but is automatically oriented when a special combined eyeletting and cutter type of eyeletting machine is used to attach the cutter to the reel.

With these and other objects in view, my invention consists in the construction, arrangement and combination of the various parts of my leader dispenser cutter, whereby the objects above contemplated are attained, as hereinafter more fully set forth, pointed out in my claims and illustrated in detail on the accompanying drawing, wherein:

FIG. 1 is a full size face view of a reel with my leader cutter mounted thereon.

FIG. 2 is a full size perspective view of a stock eyelet that I use to form my cutter.

FIG. 3 is a sectional view on the line 3—3 of FIG. 1 showing the reel and cutter enlarged.

FIG. 4 is a further enlarged sectional view similar to a portion of FIG. 3 showing the initial insertion of the eyelet in a perforation of the reel.

FIG. 5 is a similar sectional view and shows the dies of a special eyeletting machine cooperating with the eyelet to deform it and form a cutter thereon, the position of initial contact of the dies with the eyelets being shown.

FIG. 6 is a further enlarged similar sectional view showing the completed operation of the eyeletting machine which has so deformed the eyelet as to retain it in position and has also formed a cutting tongue thereon.

FIG. 7 is a similar sectional view showing the eyelet removed from the dies and showing the final form of the cutter; and FIG. 8 is an enlarged perspective view of the cutter per se.

On the accompanying drawing, I have used the reference character R to indicate a dispensing reel and C my leader cutter associated therewith. As shown in FIG. 2 the reel R comprises a pair of identical plastic members having central washer-like discs 10 perforated as indicated at 22 which diverge at their peripheries as indicated at 12 and then extend radially outward again as in 14, terminating in closely spaced flanges 16 providing a peripheral slot 18. Leader material 20 wound in the spaces defined by the parts 12, 14 and 16 extends from the reel, thereby providing access for the purpose of unwinding as much as desired. One portion of the unwound part as illustrated extends as at $20^a$ in FIGS. 1 and 3 to the cutter C and then from the cutter as indicated at $20^b$ so that by grasping the part $20^a$ and pulling on the part $20^b$ the leader will be severed at the cutter. Thus a leader of the desired length can be cut from the leader material 20 on the reel.

The cutter C comprises a stock eyelet E of the kind shown in FIGS. 2, 4 and 5 consisting of a tubular portion 24 having a closed end 26 and an outwardly projecting flange 28 at the opposite end. One of the discs 10 is provided with a perforation 30 to receive the stock eyelet E as shown in FIGS. 4 and 5 whereupon the eyelet may be retained in position by applying a special eyeletting machine thereto. The dies of the machine are shown in FIG. 5, and comprise a lower die 32 having a shoulder 34 for the flange 28 to rest on and a reduced portion 36 on top of which is a projection 38 for shearing coaction with a depression 40 in an upper die 42.

When the upper die is pressed downwardly relative to the lower die as in FIG. 6 the projection 38 and the depression 40 coact to partially shear a tongue 44 from the top 26 of the eyelet as also shown in FIGS. 7 and 8. This shearing operation leaves a wedge-shaped slot 46 to receive the leader 20, and since the tongue edges are sheared they are sufficiently ragged and sharp to cut the leader when the portions $20^a$ and $20^b$ thereof are manipulated as already described.

The dies 32 and 42 at the same time cause the cylindrical wall 24 of the eyelet E to bulge as indicated at 48 in FIGS. 6, 7 and 8 which retain the cutter C with respect to the perforation 30 of the reel disc 10. The bulge 48 also prevents subsequent rotation of the cutter C relative to the reel R and thus I am able to use a symmetrical eyelet that is oriented at the time of assembly to the reel half by the dies 32 and 42. This eliminates the problem of orientation heretofore experienced with nonconcentric cutter clips.

While I have described a bulge 48 to retain the cutter C with respect to the disc 10, the bulge can be omitted particularly if the eyelet E is a tight frictional fit in the perforation 30. Such frictional fit prevents the cutter C from rotating, thus insuring its proper orientation, and after the two halves of the reel are assembled as shown in FIG. 3, the lower disc 10 confines the flange 28 in such manner that the cutter is thereby retained against subsequent dislocation from the reel. The flange 28 effects a spacing apart of the two discs 10, but ordinarily this space is filled with a disc 50 of paper or cardboard having a trade-mark, instructions, etc. printed thereon and visible through the discs 10 when made of transparent plastic material.

From the foregoing specification it will be obvious that I have provided a relatively simple cutter for the leader material wound on a dispenser reel or for any reeled or spooled cord, thread or the like, and one which does not have to be oriented in the machine that applies the cutter to the reel. By merely orienting the reel relative to the dies 32 and 42 the symmetrical eyelet is automatically oriented for proper cutting relationship to the reel R, and the resulting cutter is inexpensive to procure since it is a stock item, and economical to install as it requires only a single punch press or eyeletting machine type of operation.

Some changes may be made in the construction and other details of my leader dispenser cutter without departing from the real spirit and purpose of my invention, and it is my intention to cover by my claims any modified forms of structure or use of mechanical equivalents which may reasonably be included within their scope.

I claim as my invention:

1. The combination with a dispenser reel for flexible cord-like material, of a cutter comprising a tubular element extended through an opening of the reel, one end of said tubular element being flanged outwardly to limit the extension of said tubular element through said reel, the other end thereof having an end wall, a cutting lip partially sheared from said end wall, providing a wedge-shaped entrance opening for said flexible material and providing cutting edges between said lip and said entrance opening, and said tubular portion being bulged opposite said flange to retain said cutter in said opening of said reel to orient the cutter relative thereto.

2. The combination with a dispenser reel for leader material or the like, of a cutter comprising a tubular element extended through an opening in one of two center discs of the reel, one end of said tubular element having a wall, a cutting lip partially sheared from said wall, providing a wedge-shaped entrance opening for leader and further providing cutting edges between said lip and said entrance opening, and means to retain said tubular portion in said opening of said one center disc comprising a flange on the other edge of said tubular element and confined between said two center discs.

References Cited in the file of this patent

UNITED STATES PATENTS

| | | |
|---|---|---|
| 942,988 | Warren | Dec. 14, 1909 |
| 2,824,709 | Macy | Feb. 25, 1958 |
| 2,875,963 | Collins | Mar. 3, 1959 |
| 2,942,764 | Castelli | June 28, 1960 |